United States Patent [19]

Cumley

[11] Patent Number: 4,677,255
[45] Date of Patent: Jun. 30, 1987

[54] INSULATING SHROUD AND SLEEVE FOR THE CONNECTION BETWEEN A CABLE END AND A TERMINAL

[75] Inventor: Roy Alan F. Cumley, Eastleigh, England

[73] Assignee: Pirelli General plc, Great Britain

[21] Appl. No.: 821,396

[22] Filed: Jan. 22, 1986

[30] Foreign Application Priority Data

Feb. 15, 1985 [GB] United Kingdom ............... 8503917

[51] Int. Cl.4 .......................................... H02G 15/10
[52] U.S. Cl. ..................................... 174/87; 174/18;
174/71 R; 174/138 F; 439/190; 439/750
[58] Field of Search ................ 174/18, 71 R, 77 S,
174/87, 138 F; 339/26, 36, 115 R, 115 C, 116 R,
116 C, 206 R, 207 R, 209, 213 R, 213 S, 213 T

[56] References Cited

U.S. PATENT DOCUMENTS

| 1,912,980 | 6/1933 | Hoogendorn | 339/206 R X |
| 2,551,895 | 5/1951 | Noir | 339/116 R X |
| 2,670,870 | 3/1954 | Fleischer | 174/138 F X |

FOREIGN PATENT DOCUMENTS

| 2659234 | 6/1978 | Fed. Rep. of Germany | 174/73 R |
| 2726403 | 12/1978 | Fed. Rep. of Germany | 174/73 R |
| 3248212 | 7/1984 | Fed. Rep. of Germany | 174/73 R |
| 60239 | 4/1954 | France | 339/115 R |
| 290820 | 5/1928 | United Kingdom | 339/26 |
| 422731 | 1/1935 | United Kingdom | 174/138 F |
| 1031353 | 6/1966 | United Kingdom | 174/18 |
| 1162298 | 8/1969 | United Kingdom | 174/138 F |
| 1183687 | 3/1970 | United Kingdom | 174/75 C |

*Primary Examiner*—Laramie E. Askin
*Attorney, Agent, or Firm*—Brooks Haidt Haffner & Delahunty

[57] ABSTRACT

An electrical termination comprises a cable lug 1 fitted to an end of an electric cable 3 and connected to a terminal 5 provided with an insulating bushing 6. An insulating shroud 13 comprising a rigid sleeve 14 and a removable closure element 15 fits over the terminal in spaced relationship thereto, with the space between the sleeve 14 and the bushing 6 at the end portion 19 of the sleeve 14 opposite the closure element 15 being closed by an annular insulating member 18. The sleeve and the closure element are provided with cooperating open end slots 20, 21 which define an aperture in the shroud in which a further insulating sleeve 23 fits so as to extend outwardly from the shroud. The cable lug 1 passes through the sleeve 23.

6 Claims, 3 Drawing Figures

INSULATING SHROUD AND SLEEVE FOR THE CONNECTION BETWEEN A CABLE END AND A TERMINAL

This invention relates to the insulation of an electrical termination in which a cable lug is connected to a terminal provided with an insulating bushing.

Such terminations are typically made within a metal cable box which is subsequently filled with an insulating compound. For example, the terminal may be a terminal of a power transformer, the insulating bushing carrying the conductor of the terminal through the metal tank of the transformer and the cable box being secured to the tank externally thereof.

The need to fill the cable box with insulating compound, which is typically a bituminous compound, to insulate the exposed electrically conductive parts of the termination from the metal of the cable box and tank, is disadvantageous both regarding costs and also, should the need arise, the difficulty involved in disconnecting the termination.

An object of the present invention is to avoid, or at least significantly reduce, the use of insulating compound when insulating the electrical termination in which a cable lug is connected to a terminal provided with insulating bushing; and with this object in mind, the invention provides an electrical insulating device for such an electrical termination, said device comprising an insulating shroud comprising a rigid sleeve and a removable closure element for closing one end of the sleeve, which shroud is adapted to fit over the terminal in spaced relationship thereto, an annular insulating member adapted to fit around the insulating bushing in engagement therewith for closing the space between the sleeve and the bushing at the end portion of the sleeve opposite said one end thereof, at least one of said sleeve and said closure element having an open ended slot such that said sleeve and closure element cooperate to define an aperture in said shroud for allowing passage into said shroud of the cable lug when connected to the terminal.

Preferably, the device comprises a further insulating sleeve for the cable lug, which further sleeve fits in said aperture and extends outwardly from said shroud. This further sleeve may be rigid and may be provided with a radially outwardly opening groove for location of the edges of the aperture in said shroud.

The insulating annular member may comprise a frusto conical body portion, the smaller diameter end portion of which engages the terminal insulating bushing, in use, and the larger diameter end portion of which is provided with means for engaging the shroud sleeve. Preferably, the larger diameter end portion of the annular insulating member is provided with a radially outwardly extending annular flange which is provided with an annular groove for receiving the end of said shroud sleeve opposite said one end thereof.

The invention also includes an electrical termination comprising a cable lug fitted to an end of an electric cable and connected to a terminal provided with an insulating bushing, an insulating shroud comprising a rigid sleeve and a removable closure element closing one end thereof fitting over the terminal in spaced relationship thereto, the space between the sleeve and the bushing at the end portion of the sleeve opposite the closure element being closed by an annular insulating member and at least one of said sleeve and closure element having an open ended slot such that the sleeve and closure element cooperate to define an aperture in the shroud through which the cable lug extends.

Preferably, in such an electrical termination, a further insulating sleeve fits in said aperture and extends outwardly from the shroud, the cable lug passing through said further sleeve. Also preferably, an elastic insulating tube fits over and extends between said further sleeve and the cable end adjacent the cable lug.

The invention also includes an electrical termination as defined in the preceding paragraph before last when made within a cable box and wherein the cable box is devoid of insulating compound.

In order that the invention may be well understood, an embdiment thereof, which is given by way of example only, will now be described with reference to the accompanying drawings, in which.

Figure 1:
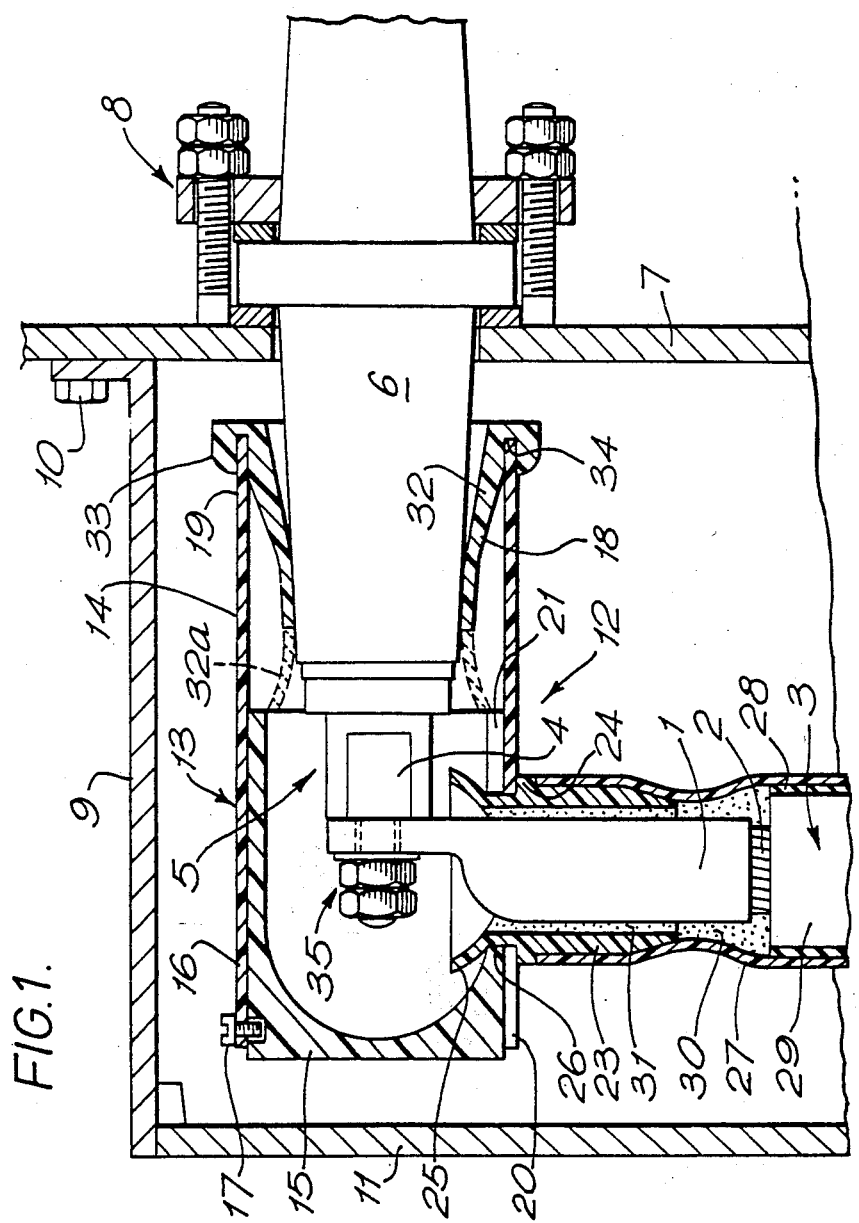
FIG. 1 is a cross-sectional view of an electrical termination of a power transformer.

Referring first to FIG. 1, there is shown in electrical termination comprising a cable lug 1 fitted to the conductor 2 at an end of an electric cable 3, which lug is connected to the conductor 4 of a terminal 5 of a transformer, the terminal being provided with an insulating bushing 6 of porcelain which carries the conductor of the terminal through the metal tank 7 of the transformer. The terminal 5 is secured to the tank 7 by a clamping arrangement 8 disposed within the tank and a metal cable box 9 secured to the tank externally thereof, for example by bolting as shown at 10, and provided with a removable cover 11 accommodates the termination. The arrangement as thus far described is conventional and in such conventional arrangements the practice is to fill the cable box with an insulating bituminous compound to insulate the exposed electrically conductive parts of the termination from the metal of the cable box and tank. Insulating compound is expensive and also since it requires the application of heat, inconvenient. Furthermore, the presence of the compound in the cable box hinders any subsequent disconnection of the termination. To overcome these disadvantages, in the embodiment the termination is insulated from the metal of the tank and cable box by an insulating device 12 and no compound is introduced into the cable box.

Figure 2:
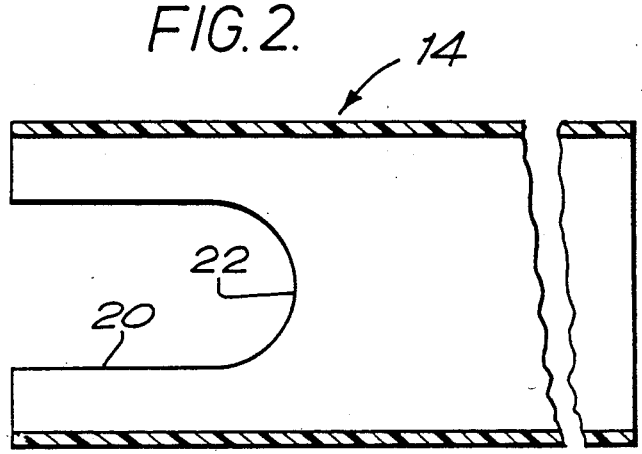
FIG. 2 is an axial cross-section of a sleeve of a shroud of an insulating device of the termination illustrated in FIG. 1.
Figure 3:
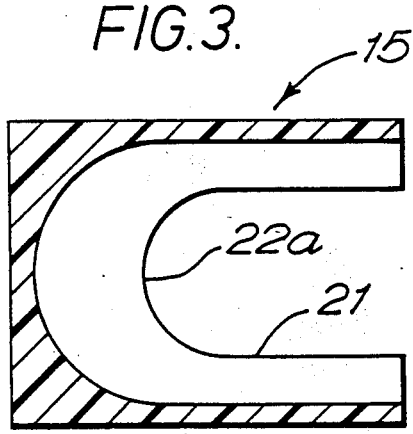
FIG. 3 is an axial cross-section of a closure element for the sleeve of the same shroud.

The insulating device 12 comprises an insulating shroud 13 which is adapted to fit over the terminal 5 in spaced relationship thereto. The shroud 13 comprises a rigid sleeve 14, for example of P.V.C. polypropylene or polyethylene and a closure element 15, for example of nylon, polypropylene, silicone rubber or EPDM, which closes the end 16 of the sleeve 14 remote from the tank 7. As illustrated, the closure element 15 fits within the sleeve 14 and is secured axially relative thereto by a plurality of threaded fasteners 17 (only one of which is shown). The device also includes an annular or tubular insulating member 18 of a resilient material such as silicone rubber, EPR of EPDM which is located at the end portion 19 of the sleeve remote from the closure element 15 and fits around the terminal bushing 6 in engagement therewith to close the space between the sleeve 14 and the bushing 6 at the end portion 19 to prevent flashovers through that space. The sleeve 14 and closure element 15 are provided with cooperating open ended slots 20 and 21 which are best shown in FIGS. 2 and 3 respectively. When the closure element 15 is positioned in the sleeve 14 with the slots 20, 21 aligned as shown in FIG. 1, the semicircular closed ends 22, 22a of the slots define a circular aperture in the side of the shroud which allows passage of the cable lug 1 into the shroud when the lug is connected to the terminal 5. As shown, the insulating device 12 comprises a further insulating sleeve 23, for example of nylon, polypropylene, silicone rubber or EPDM, which fits in the circular aperture and extends outwardly from the shroud. The sleeve 23 is rigid and is provided between an outwardly extending radial flange 24 and a cup-shaped end portion 25 with a radially outwardly opening groove 26 in which the edge of the aperture formed by the edges of the ends 22,22a of the slots 20,21 locate. The end portion 25 is cup-shaped to allow positioning of this portion within the interior of the closure element 15 in view of its dome-shaped configuration and to increase the leakage path at this location.

An elastic insulating tube 27, for example of silicone rubber, fits over and extends between the sleeve 23 and the cable end 3 adjacent the lug 1. The tube 27 is shown in tight engagement with an elastic rubber insulating tube 28 which is located over the bared insulation 29 of the cable end 3. The annular space 30 between the ends of sleeve 23 and tube 27 is filled with putty or mastic impregnated tapes and mastic is located in the annular gap 31 between the sleeve 23 and cable lug 1.

The illustrated annular insulating member 18 comprises a frusto conical body portion 32, the smaller diameter end portion of which engages the terminal insulating bushing 6, which itself is frusto conical in the embodiment. The frusto conical configuration and resilience of the member 18 ensures engagement with the bushing 6 and also allows the same member 18 to be used with bushings 6 over a range of diameters and with both frusto conical and cylindrical configurations. A flared extension indicated in dotted line at 32a may extend from the smaller diameter end portion of the body 32 as illustrated for preventing flashover from the terminal conductor.

The larger diameter end portion of the member 18 is secured relative to the shroud sleeve, and in the embodiment is provided with means at its larger diameter end portion which engages the shroud sleeve. As illustrated, the larger diameter end portion is provided with a radially outwardly extending annular flange 33 which is provided with an annular groove 34 which receives the end of the shroud sleeve.

It will be appreciated that in order to make the illustrated termination, the end of the cable 3 can be completely prepared away from the terminal 5. That is the cable lug 1, further sleeve 23, and insulating tube 27 can be fitted to the cable end prior to electrical connection of the lug 1 to the conductor of the terminal 5, which as illustrated may be by way of a conventional threaded stud and nut arrangement 35. This is because the aperture of the shroud through which the lug 1 passes is defined by the open ended slots 20,21 of the shroud sleeve 14 and closure element 15. Thus, the prepared cable end can be passed through the open end of the slot 20 of the shroud sleeve 14 after the latter has been positioned relative to the terminal 5 and prior to the fitting of the closure element 15 in the shroud sleeve. This feature of the embodiment greatly facilitates making of the termination and subsequent disconnection thereof should this be required.

Whilst it is preferred to provide both the closure element and the shroud sleeve with cooperating open-ended slots for defining the shroud aperture, since this enables a circular aperture to be provided, it is to be understood that the above described advantage would also be present if only the shroud sleeve or only the closure element were provided with an open ended slot which was closed by the other shroud part to define the aperture when the shroud sleeve and closure element were fitted together.

If desired, the shroud may be packed with a mastic insulating compound; but, it is envisaged that this will not ordinarily be required.

Once the termination is made, the annular insulating member 18 of the insulting device is retained in position by the shroud sleeve 14 which itself is retained in position by the further sleeve 23 the position of which is fixed relative to the terminal 5 by virtue of the connection of the lug 1 to the terminal 5.

The above described insulating device insulates the exposed electrically conductive parts of the termination from the metal of the cable box and tank thus avoiding the need to fill the cable box with insulating compound.

It is presently envisaged that the illustrated arrangement will be used for terminating cables rated from 6 kV to 33 kV.

It will be appreciated that the illustrated insulating device may be readily modified to enable more than one cable to be connected to the terminal by providing additional further sleeves 23 which locate in further apertures in the shroud defined by further slots in the parts thereof.

I claim:

1. An electrical insulating device for enclosing and electrically insulating a lug at the end of a high voltage cable connected to a terminal extending from an insulating bushing, said electrical insulating device comprising:

a rigid sleeve of insulating material adapted to be mounted with radial clearance around said terminal and a portion of said bushing, said sleeve having an axially extending slot therein for receiving said lug;

a tubular member of elastomeric material and of frusto-conical shape, adapted to be mounted intermediate said sleeve and said bushing, with one end thereof secured in sealing relation to the end of said sleeve which is to be adjacent said bushing and with the other end thereof within said sleeve and for tightly engaging said bushing at a portion thereof spaced inwardly of said sleeve from said end of said sleeve;

a removable closure element for closing the opposite end of said sleeve, said closure element having an axially extending slot therein alignable with said slot in said sleeve for receiving said lug; and a further sleeve of insulating material, adapted to be mounted around said lug, with a first portion thereof within said rigid sleeve and extending through said slot in said rigid sleeve and said slot in said closure element and being in engagement with the wall of at least one said slot, said further sleeve also having a second portion outside said rigid sleeve, and said first portion of said further sleeve being radially outwardly flared within said rigid sleeve.

2. A device as claimed in claim 1, wherein said further sleeve is rigid and is provided with a radially outwardly opening and peripherally extending groove intermediate said first portion thereof and said second portion thereof for receiving the walls of at least one said slot.

3. A device as claimed in claim 1, wherein the larger diameter end portion of said tubular member is provided with a radially outwardly extending annular flange which is provided with an axially extending, annular groove for receiving the first-mentioned said end of said rigid sleeve.

4. An electrical termination comprising:
a terminal extending from an insulating bushing;
a cable lug secured to the conductor of a high voltage cable and to said terminal;
a rigid sleeve of insulating material mounted with radial clearance around said terminal and a portion of said bushing, said sleeve having an axially extending slot therein receiving said lug;
a tubular member of elastomeric material and of frusto-conical shape mounted intermediate and sleeve and said bushing with one end thereof secured in sealing relation to the end of said sleeve adjacent said bushing and with the other end thereof within said sleeve and tightly engaging said bushing at a portion thereof spaced inwardly of said sleeve from said end of said sleeve;
a closure element closing the opposite end of said sleeve, said closure element having an axially extending slot therein alignable with said slot in said sleeve and receiving said lug; and
a further sleeve of insulating material mounted around said lug with a first portion thereof within the first-mentioned rigid sleeve and extending through said slot in said rigid sleeve and said slot in said closure element and being in engagement with the wall of at least one said slot, said further sleeve also having a second portion outside said rigid sleeve, and said first portion of said further sleeve being radially outwardly flared within said rigid sleeve.

5. An electrical termination as claimed in claim 4, further comprising an elastic insulating tube around said second portion of said further sleeve and extending between said further sleeve and the end of said cable adjacent to said cable lug.

6. An electrical termination as claimed in claim 4 or 5 further comprising a cable box around said bushing, said rigid sleeve and said first portion of said further sleeve, said cable box being devoid of insulating compound intermediate said cable box and said bushing, said rigid sleeve and said first portion of said further sleeve.

* * * * *

UNITED STATES PATENT AND TRADEMARK OFFICE
CERTIFICATE OF CORRECTION

PATENT NO. : 4,677,255

DATED : June 30, 1987

INVENTOR(S) : Roy A. F. Cumley

It is certified that error appears in the above-identified patent and that said Letters Patent is hereby corrected as shown below:

Col. 1, line 49, "insulating annular" should read --annular insulating--;

Col. 2, line 25, "in" should read --an--;

Col. 2, line 62, "EPR of" should read --EPR or--.

Signed and Sealed this

Twenty-seventh Day of October, 1987

Attest:

DONALD J. QUIGG

*Attesting Officer*   *Commissioner of Patents and Trademarks*